W. T. Fry,
Breast Pump.
No. 70,988. Patented Nov. 19, 1867.

Witnesses:
John Parker
Mowbotham

Inventor:
W. T. Fry
By his attorney.
H. Howson.

United States Patent Office.

WILLIAM T. FRY, OF NEW YORK, N. Y.

Letters Patent No. 70,988, dated November 19, 1867.

---

IMPROVEMENT IN BREAST-PUMPS.

---

*The Schedule referred to in these Letters Patent and making part of the same.*

---

TO ALL WHOM IT MAY CONCERN:

Be it known that I, WILLIAM T. FRY, of the city, county, and State of New York, have invented certain Improvements in Breast-Pumps; and I do hereby declare the following to be a full, clear, and exact description of the same.

My invention consists of a breast-pump, which is simple in its construction, efficient in its operation, and may be applied without pain to the breast.

In order to enable others skilled in the art to make and use my invention, I will now proceed to describe its construction and operation, reference being had to the accompanying drawing, which forms a part of this specification, and in which—

Figure 1:
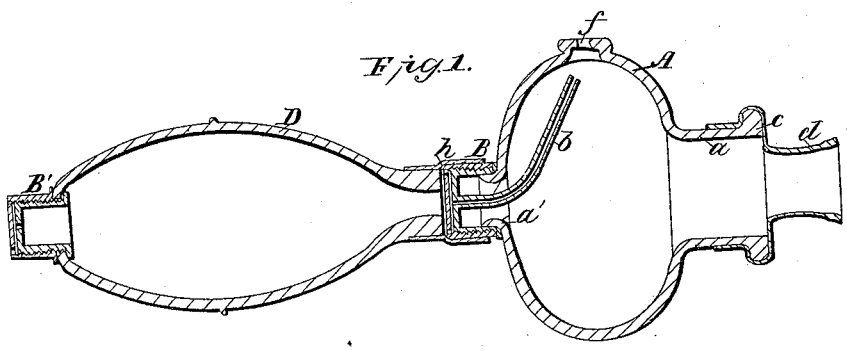

Figure 1 is a longitudinal section of my improved breast-pump.

Figure 2:
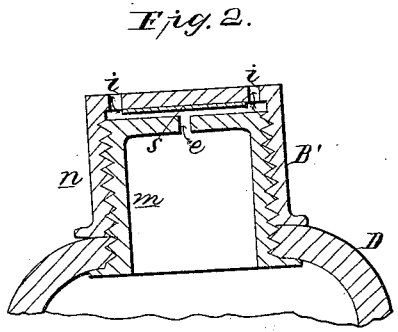

Figure 2, a detached view of part of the pump, drawn to an enlarged scale.

A is a circular vessel, of glass or other material, the opposite sides of which are slightly flattened, as shown in the drawing. From the centre of one side of the vessel projects a neck, $a$, having a flange or rib, $c$, near its outer edge, and at the opposite side of the vessel is a hollow projection, $a'$, to which is fitted a valve-case, B. From the centre of the valve-case B projects a tube, $b$, which communicates with the interior of the valve-case and with the vessel A, the upper end of the tube being adjacent to an opening, $f$, in the edge of the vessel A. One end of a rubber tube, $d$, is drawn over the neck $a$, and, by contracting on the latter, at the rear of the flange $c$, is securely fastened in its place. At one end of an oval elastic vessel, D, is a valve-case, B', and at the opposite end of the vessel is a flexible lip or flange, $h$, which may be expanded so as to enclose the valve-case B, as shown in fig. 1. Each valve-case consists of a cap, $m$, having external screw-threads adapted to those at the interior of a screw-cap, $n$, and between the tops of the caps is sufficient space to permit a rubber disk or valve, $s$, to vibrate freely. In the centre of the top of the cap $m$ is an opening, $e$, and in the top of the cap $n$, near the opposite sides, are openings, $i\ i$.

Owing to the arrangement of the casings and their valves, the air will be expelled through the case B' from the vessel D, when the latter is compressed, and will be drawn from the vessel A into the said vessel D, when it resumes its shape. After passing the flange $h$ over the valve-case B, as shown in fig. 1, the vessel A is turned so that the opening $f$ shall be uppermost, and the end of the flexible tube $d$ is applied to the breast, the vessel A being so held in one hand that the opening $f$ may be covered by the thumb, or one of the fingers, while the vessel D is grasped by the other hand. The vessel D is now alternately compressed and released, when the air within the vessel A will be withdrawn, and the milk will be caused to flow into the vessel, the tube $b$ preventing the milk from gaining access to the valve-case, without interfering with the passage of air from one vessel to the other. Should the pressure upon the breast become painful, it may be instantly removed by uncovering the opening $f$. As the tube $d$ is soft and flexible at its end, it will adapt itself to the breast, and will fit closely, without the necessity of applying any painful pressure to prevent the access of air. Owing to the arrangement of the vibrating valve $s$, between the two caps $m\ n$, such an effectual opening and closing of the air-passages is obtained that the air in the vessels may be readily withdrawn, while any injurious leakage, or the possibility of the valves getting out of order, is effectually prevented. By detaching the tube $d$, access may be had to the interior of the vessel A, when it is necessary to clean the same, the rib $c$ effectually preventing the tube from slipping from its place, without interfering with its ready removal when required.

As the vessel A will form the subject of another application for Letters Patent, I make no claim to the same here; but claim as my invention, and desire to secure by Letters Patent—

1. The tube $d$, flexible at its outer end, in combination with a receiving-vessel, A, and with a vessel, D, or equivalent device, for exhausting the air from the vessel A, substantially as and for the purpose described.

2. The valve-case B, consisting of detachable caps $m\ n$, with their openings, $e\ i\ i$, and the vibrating disk $s$, the whole being constructed and arranged substantially as specified.

In testimony whereof I have signed my name to this specification in the presence of two subscribing witnesses.

WM. T. FRY.

Witnesses:
CHARLES E. FOSTER,
W. J. R. DELANY.